United States Patent
DiFonzo et al.

(10) Patent No.: US 9,214,268 B2
(45) Date of Patent: Dec. 15, 2015

(54) METHOD AND APPARATUS FOR PRODUCING ACCURATE KINEMATICS IN A COMPUTING DEVICE

(71) Applicant: Apple Inc., Cupertino, CA (US)

(72) Inventors: John C. DiFonzo, Emerald Hills, CA (US); Fabio T. Campos, San Francisco, CA (US); Jonathan E. Borkowski, Cupertino, CA (US); Chee How Chong, Shanghai (CN); Matthew W. Blum, San Francisco, CA (US); William A. Tashman, Cupertino, CA (US); Michelle R. Goldberg, Sunnyvale, CA (US); Stefano Tizianel, Legnano (IT); Noemi Novello, Parabiago (IT)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 14/213,831

(22) Filed: Mar. 14, 2014

(65) Prior Publication Data

US 2015/0262746 A1  Sep. 17, 2015

(51) Int. Cl.
*H01F 7/20* (2006.01)

(52) U.S. Cl.
CPC ........................ *H01F 7/20* (2013.01)

(58) Field of Classification Search
CPC ...... H01F 13/003; H01F 13/00; G06F 1/1615
USPC .......................................... 335/284
See application file for complete search history.

(56) References Cited

U.S. PATENT DOCUMENTS

| | | | | |
|---|---|---|---|---|
| 4,359,765 A * | 11/1982 | Mimura | ................ | H01F 13/003 335/284 |
| 4,931,730 A * | 6/1990 | Olsen | ................... | G01N 27/72 324/209 |
| 6,151,486 A * | 11/2000 | Holshouser | ......... | H04M 1/0214 379/433.13 |
| 7,332,990 B2 * | 2/2008 | Lo | ........................... | E05C 19/16 24/303 |
| 8,908,366 B2 * | 12/2014 | Wu | ....................... | G06F 1/1679 292/251.5 |
| 2002/0158657 A1* | 10/2002 | Takagi | .................. | H02K 15/03 324/765.01 |
| 2005/0018393 A1* | 1/2005 | Kuo | ...................... | G06F 1/1616 361/679.58 |
| 2012/0038440 A1* | 2/2012 | Roberts | ................. | G01D 18/00 335/284 |
| 2012/0069540 A1* | 3/2012 | Lauder | .................. | G06F 1/1626 361/807 |
| 2014/0104021 A1* | 4/2014 | Fullerton | .............. | H01F 13/006 335/284 |

* cited by examiner

*Primary Examiner* — Alexander Talpalatski
(74) *Attorney, Agent, or Firm* — Doweny Brand LLP

(57) ABSTRACT

Method, system, and apparatus for optimizing kinematics of a magnetic latch having a magnetic element is disclosed.

20 Claims, 7 Drawing Sheets

METHOD AND APPARATUS FOR PRODUCING ACCURATE KINEMATICS IN A COMPUTING DEVICE

FIELD

The embodiments described herein relate generally to providing a consistent user experience for a family of consumer electronic products.

BACKGROUND

As portable computing devices such as laptops become smaller and more lightweight, variations due to manufacturing and assembly tolerances can become more significant factors in a user experience of the finished products.

SUMMARY

A method for optimizing kinematics of a magnetic latch having a magnetic element is disclosed. In one embodiment, the method is carried out by performing at least the following operations: determining a release force required to release the magnetic latch, determining a deviation of the release force with respect to a reference datum, and adjusting a magnetic property of the magnetic element in-situ in accordance with the deviation.

In another embodiment, a post-assembly quality check station for checking a compliance of a release force associated with a magnetic latch used to secure a lid and base unit of a laptop is disclosed. The post assembly quality check station includes at least a release force analyzer configured to determine the release force, and a magnetic adjuster in communication with the release force analyzer, the magnetic adjuster configured to adjust magnetic properties of the magnetic latch in-situ in accordance with the determined release force.

An apparatus for optimizing kinematics of a magnetic latch having a magnetic element includes at least means for determining a release force required to release the magnetic latch, means for determining a deviation of the release force with respect to a reference datum, and means for adjusting a magnetic property of the magnetic element in-situ in accordance with the deviation.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

In the figures, elements referred to with the same or similar reference numerals include the same or similar structure, use, or procedure, as described in the first instance of occurrence of the reference numeral.

DETAILED DESCRIPTION

Figure 1:
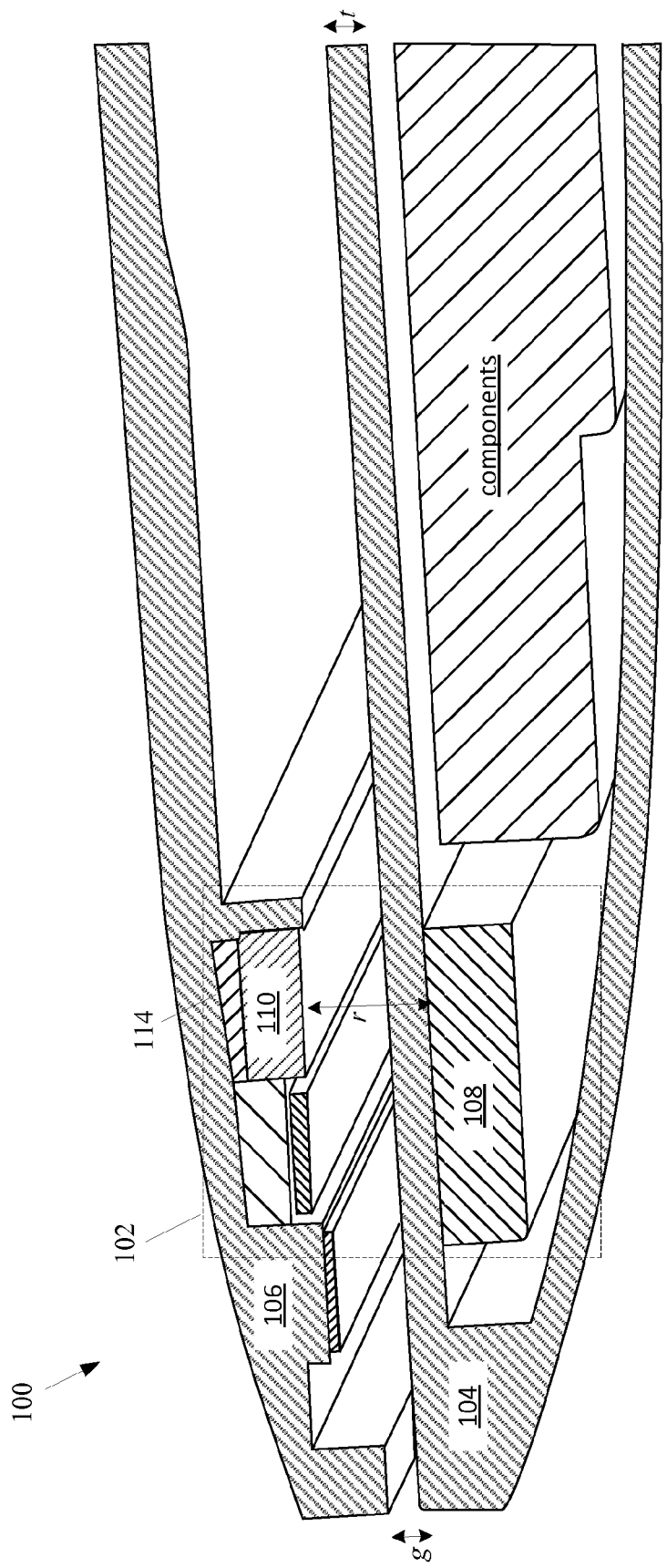
FIG. 1 shows a cross section of a lid/base unit of a laptop.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. These and other embodiments are discussed below. However, those skilled in the art will readily appreciate that the detailed description given herein with respect to these figures is for explanatory purposes only and should not be construed as limiting.

This paper describes various embodiments that relate to a look and feel of a portable computing device. More specifically, as portable computing devices such as laptops become smaller and more lightweight, manufacturing and assembly tolerances can become more significant factors in a user experience of the finished products. For example, kinematics of laptops (specifically with those that use a magnetic latch to secure a base unit and a lid) can be affected by variations associated with manufacturing, components, and assembly. More specifically, the kinematics related to the look and feel of the base unit and lid can vary due to even small variations in such factors as gap, magnetic variation, and so on. In other words, a manner in which the lid and the base unit open and close, the ability of the lid and base unit to remain latched when not in use, can all be affected by these factors. For example, the laptop is typically stored and transported in a closed configuration and opened for operation by a user. Therefore, in the closed configuration, it is desirable for the laptop to remain closed in spite of the inevitable shocks and vibrations. Moreover, when the time comes for the user to open the laptop, the user should experience an ease of opening that does not detract from the overall experience by requiring an inordinate amount of force. Accordingly, the mechanical design of the laptop and associated components should be one that optimizes the desired user experience.

Accordingly, various embodiments are disclosed herein that describe a method, apparatus, and system for adjusting a magnetic latch in-situ to compensate for a total variability in each individual unit assuring an optimal kinematic experience for a user. It should be noted that by in-situ it is meant that magnet adjustments are carried out with the magnetic latch assembled in a finished product. In one embodiment, a laptop having completed assembly is sent to a post assembly station for determining a force required to unlatch the base unit and the lid. More specifically, the base unit is secured and a force applicator applies a force to the lid while an applied force is measure. Data associated with an amount of applied force (unlatch or release force) required to release the magnetic latch and move the lid with respect to the base unit a pre-determined distance is recorded to a database for comparison to an acceptable range. When the unlatch force is not within the range, then a magnetic element associated with the magnetic latch is adjusted (either de-magnetized or re-magnetized) in accordance with a variance of the unlatch force with respect to the acceptable range. The unit is evaluated again and an adjusted unlatch force is determined. The process is repeated until the variation of the unlatch force is deemed to be within the range of acceptable values. It should also be noted that it can be advantageous to magnetize magnetic elements that are heretofore in an un-magnetized state. In this way, the magnetic elements can be magnetized to a desired magnetic state with few if any effects due to magnetic hysteresis or issues related to incorrect polarities. Furthermore, the magnetic elements in the un-magnetized state are easier to handle and makes any assembly process that much easier.

In some cases, the magnetic elements can be calibrated while in a sub-assembly prior to installation in a finished product. For example, a magnetic latch mechanism can be calibrated prior to actual installation in a laptop computer (as long as other components and related factors, such a torque, are taken into account). In this way, the assembly process can be standardized to a degree not available in the assembly processes that require calibration and magnetization of assembled products. It should be noted that a magnetic latch unit can be used to secure bodies that are not primarily attached to each other either pivotally or otherwise. Accordingly, any attachment mechanism, or none at all, can be well suited for use with the described embodiments.

In some cases, the magnetic element can take the form of a magnetic array. The magnetic array can be either a monolithic substrate or a discrete array of magnetic elements. In any case, the adjusting of the magnetic element can be carried out by adjusting magnetic properties of the magnetic array by, for example, adjusting a magnetic polarity of selected ones of the discrete magnetic elements (or magnetic regions of the monolithic magnetic substrate). In order to de-magnetize the discrete magnetic array, selected ones of the discrete magnetic elements can be exposed to an external magnetic field of opposite polarity to the magnetic elements requiring adjustment. In some cases, a magnetic coil coupled to and driven by a DC voltage supply can generate the external magnetic field. In this way, any magnetic elements having a polarity aligned with the external magnetic field will not generally be affected (if already saturated) whereas those magnetic elements having an opposing magnetic polarity will have their magnetic field strength reduced (or even have their polarity reversed depending upon the duration and strength of the external magnetic field). It should be noted that in those situations where all of the discrete magnetic elements are to be rendered essentially magnetically neutral, then the magnetic array can be exposed to an external magnetic field coupled to and driven by an AC voltage source or even exposed to a laterally applied magnetic field.

It should be noted that the magnetic adjustment procedure can be iterative in nature by which it is meant that the magnetic array can undergo the magnetic adjustment in stages at which point the overall magnetic force can be measured and determined to be acceptable or not. Moreover, it is contemplated that with a sufficiently large amount of characterization data, that an iteration process may not be needed as it will be possible to merely subject the magnetic array to a magnetic pulse(s) having the effect of bringing the observed magnetic attraction force to within the acceptable range. It should also be noted that magnetic adjustment can be carried out using processes unrelated to magnetics. For example, a magnet can be de-magnetized using heat provided by a heat source such as an infrared heat source, a laser heat source, inductive heating and so forth. Of course, in order to alter magnetic polarity from one polarity to another, a magnetic field is used.

FIG. 1 shows a cross section laptop 100 showing selected internal elements of a base unit and a lid. More particularly, magnetic latch assembly 102 can include elements in base unit 104 and lid 106. For example, magnetic latch assembly 102 can include attraction plate 108 disposed in base unit 104. Attraction plate 108 can be formed of ferromagnetic material such as steel or selected stainless steel alloys, iron, iron-cobalt, and nickel. Attraction plate 108 can complete a magnetic circuit with magnetic element 110 disposed in lid 106 in proximity to display assembly (not shown). Magnetic shunt 114 can be located at a position relative to magnetic element 110 such that magnetic field lines propagating away from magnetic element 110 in a direction away from attraction plate 108 can be re-directed towards attraction plate 108. Accordingly, the number of magnetic field lines intersecting and interacting with attraction plate 108 can be increased over that otherwise available. In this way, an amount of magnetic attraction force developed between attraction plate 108 and magnetic element 110 per unit mass of magnetic element 110 can be enhanced obviating a need for increased magnetic mass or strength. It should be noted that although not shown in FIG. 1, base unit 104 and lid 106 are pivotally attached to each other by way of a clutch assembly that provides a force used to maintain a separation distance d between lid 106 and base unit 104 in an open configuration. It should be noted that any suitable device could be used in addition to or in place of a clutch. Such devices can include but are not limited to dashpots, air springs, other friction devices, mechanical springs, etc. The force provided by the clutch is mediated by a torque (referred to as clutch torque) applied to lid 106. Therefore, an amount of force required to open lid 106 with respect to base 104 can include at least two components, a first component associated with the magnetic attraction force developed between magnetic element 110 and attraction plate 108. A second component can be associated with the clutch assembly. Therefore, in addition to variation in magnetic latch assembly 102, variation in the clutch assembly can also add to the overall variation in a perceived unlatch force. Accordingly, any modification of magnetic properties of magnetic latch assembly 102 will only affect the first force component and not the second force component. It should be noted, however, that the clutch torque can change as the number of open/close events increases. More specifically, as mechanical elements in the clutch assembly wear, then the overall clutch torque can lessen having a net effect of reducing the second force component.

Therefore, focusing on the first (magnetic) force component and since magnetic strength varies inversely with distance (roughly inverse exponential), any increase in wall thickness t of base unit 104 can result in an increase in distance r between magnetic element 110 and attraction plate 108 (in a closed configuration). This increase in distance r can reduce the overall magnetic attraction force (the first force component) resulting in a reduced force required to unlatch magnetic latch assembly 102. Conversely, any decrease in wall thickness t can have the opposite effect resulting in a greater overall force of magnetic attraction used to secure base unit 104 and lid 106. Accordingly, a force (referred to as an unlatch force) required to release magnetic latch unit 102 (and separate lid 106 and base unit 104) can vary in accordance with the magnetic attraction force. For example, wall thickness t of base unit 116 can substantially affect overall magnetic attraction due to the inverse exponential relationship with overall distance r. Therefore, variation in magnetic attraction caused by physical variation in components such as base unit 104 can become a substantial factor in the overall user experience as it relates to opening laptop 100.

Furthermore, separation distance r can also include a component related to gap 118 between lid 106 and base 104. Gap 118 can be characterized as having gap distance g developed in the closed configuration when lid 106 and base unit 104 are in substantial contact with each other. Therefore, any variation in gap distance g can also affect the magnetic attraction between magnetic element 110 and attraction plate 108 (again by increasing or decreasing distance r). In addition to variation in assembly and manufacturing tolerances that can result in variation of physical dimensions, the user experience can also be strongly affected by variation in magnetic strength of magnetic element 110. Natural variation in magnetic strength between individual magnets can be as high as four percent that can translate into a variation of about ten percent in magnetic attraction. When all these factors are considered and taken into account, the overall variation from laptop to laptop can be on the order of about twenty to thirty percent making it difficult to maintain a high level of consistent unlatch force amongst a number of laptops. Therefore, by tightening the variation in characteristics of magnetic latch assembly 102 between individual units, the observed user experience can be rendered more consistent and uniform. It should be noted that the magnetic element 110 could also be located in base unit 104. In some cases, magnetic latch unit 102 can include magnetic elements distributed in base unit 104 as well as lid 106. Accordingly, in such an arrangements, magnets in both lid 106 and base unit 104 can be calibrated and adjusted.

Figure 2:
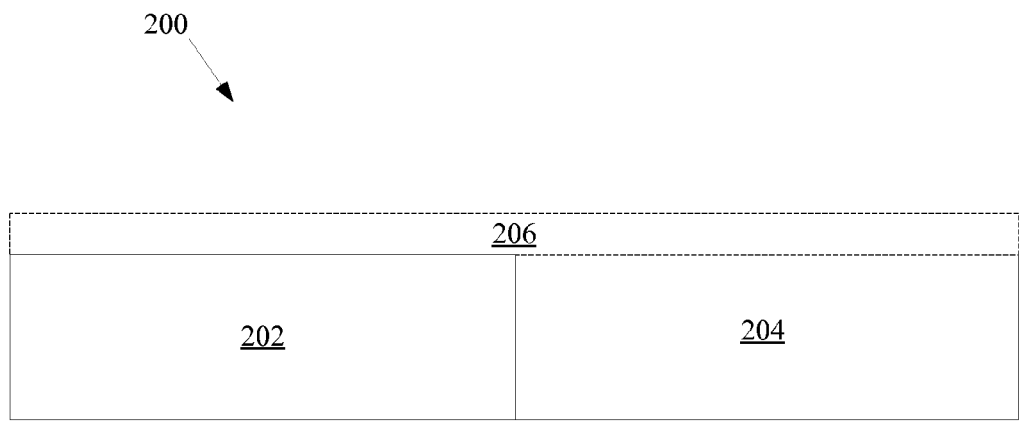
FIG. 2 shows magnetic assembly in accordance with an embodiment.

FIG. 2 shows a particular embodiment of magnetic element 110 in the form of magnetic assembly 200. Accordingly, magnetic assembly 200 can be used as an active component of magnetic latch assembly 102. More particularly, magnetic assembly 200 can be disposed in lid 106 and form a magnetic attraction with attraction plate 108. It should be noted that magnetic assembly 200 can take many forms. However, for sake of simplicity and without loss of generality, magnetic assembly 200 can take the form of an array of magnetic regions by which it is meant that well defined regions of magnetic assembly 200 can share magnetic properties (such as magnetic strength and polarity, for example). Magnetic assembly 200 can be, in one form, a monolithic substrate having contiguous regions that share magnetic properties. Magnetic assembly 200 can also take the form of a number of discrete magnetic elements each characterized as having specific magnetic properties. For example, the discrete magnetic elements can be magnets formed of neodymium, iron-cobalt, nickel, or any other suitable ferromagnetic material and each having their own intrinsic magnetic property such as magnetic strength, coercivity, polarity, and so on.

Accordingly, by arranging the discrete magnetic elements in a pre-defined order, magnetic assembly 200 can exhibit desired magnetic properties. For example, the discrete magnetic elements can be arranged linearly and position with respect to each other with an alternating polarity pattern. By alternating polarity pattern, it is meant that magnetic regions exhibit alternating magnetic polarity. For example, magnetic region 202 can be associated with first polarity P1 whereas second magnetic region 204 can be associated with second polarity P2 different than first polarity P1. It should be noted, that the properties of the various magnetic regions can be defined in accordance with properties such as magnetic polarity, size, length, etc. that can combine to provide magnetic assembly 200 with a desired set of magnetic characteristics. In some cases, magnetic shunt 206 can be used to re-direct magnetic field lines in a desired direction. For example, magnetic field lines emanating from surface 208 can at least be partially re-directed toward surface 210 forming magnetic surface 212 used to form a magnetic attraction. In this way, the total number of magnetic field lines can be increased over that otherwise expected without magnetic shunt 206. In this way, a magnetic force developed between attraction plate 108 and magnetic regions 202/204 can be enhanced without requiring an increase in magnetic mass or strength of the individual magnetic elements.

Figure 3:
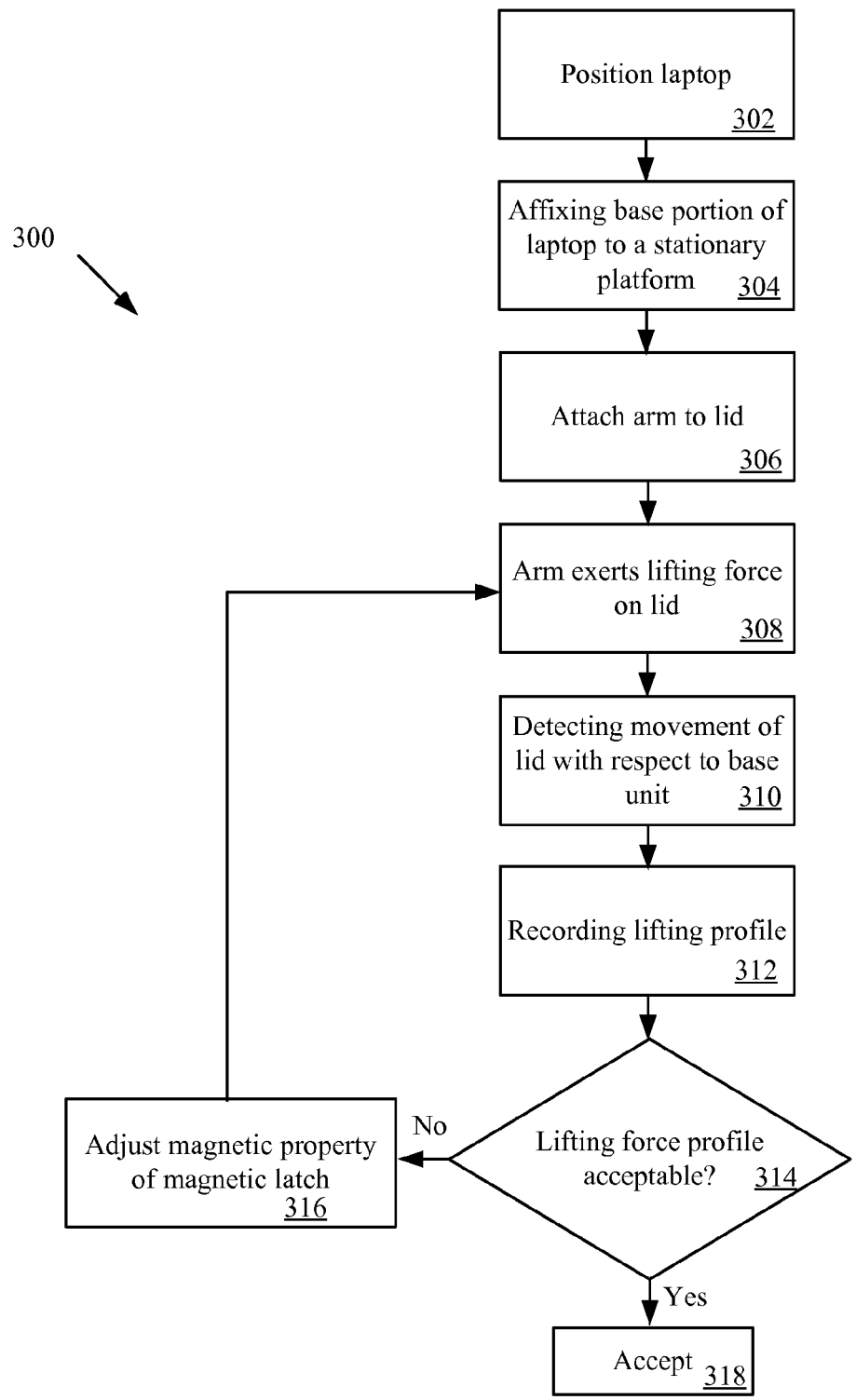
FIG. 3 shows a flowchart describing manufacturing process in accordance with a described embodiment.

FIG. 3 shows a flowchart describing manufacturing process 300 in accordance with a described embodiment. Manufacturing process 300 describes a procedure whereby a post assembly check of a finished laptop unit for an unlatch force associated with a magnetic latch used to secure a lid and base unit can be used to assure that the unlatch force is within an acceptable range, or compliance band. Manufacturing process 300 can start at 302 positioning laptop (or other device) under test into testing fixture by affixing a base portion of the laptop to a stationary platform at 304 assuring that base unit of the laptop remains stationary during the test. Next, at 306, an arm or lid mover (robotic in nature is most common) attaches to the lid and at 308 exerts an initial lifting force at which point a movement sensor detects a movement of the lid with respect to the base unit at 310. It should be noted that the force required to begin separation of the base unit and the lid has at least two components, a magnetic force developed between the lid and the base portion by a magnetic latch assembly and a force associated with a clutch torque T being a force required to overcome a moment created by a clutch assembly used to pivotally join the base unit and the lid.

In the context of this discussion, the relevant force of interest is the magnetic force created by the magnetic latch unit. Accordingly, the movement sensor continues to monitor movement of the lid with respect to the base unit concurrently with a force sensor detecting and recording the force required to maintain and increase the separation until a pre-determined separation is reached at which point the corresponding force profile is stored at 312. The stored force data is then compared to a reference datum at 314. The reference datum can take the form of, for example, a range of acceptable unlatch force values also referred to as a compliance band.

If the recorded data indicates that the unlatch force of the laptop under test does not meet outgoing quality requirements, then a magnetic adjusting mechanism is used at 316 to adjust the magnetic latching mechanism. Once the magnetic elements of the magnetic latch mechanism have been adjusted, process 300 is repeated until it is determined that the unlatch force provided by the magnetic latching mechanism is within the acceptable range and the laptop is considered accepted at 318.

Figure 4:
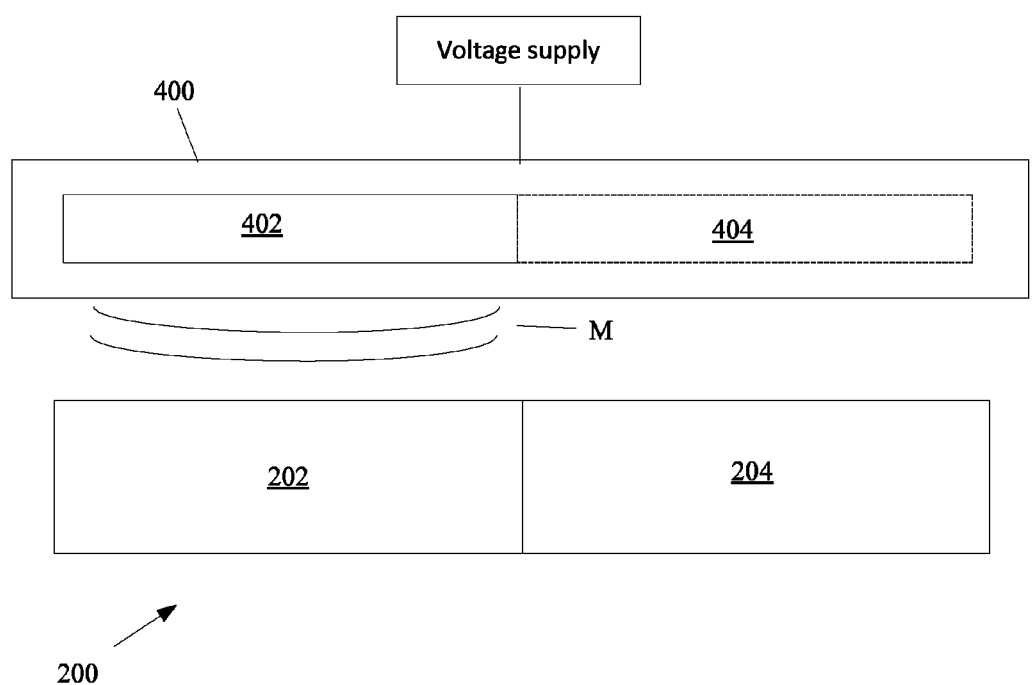
FIG. 4 illustrates magnetic adjustment system for adjusting magnetic properties of magnetic assembly in accordance with the described embodiments.

FIG. 4 illustrates magnetic adjuster 400 for adjusting magnetic properties of magnetic assembly 200 in accordance with the described embodiments. Magnetic adjuster 400 can include magnetizer 402 that can be used to provide magnetizing magnetic field M. When placed in proximity thereto, magnetic field M can modify magnetic properties of magnetic element 202. The modification of the magnetic properties of magnetic element 202 can be in accordance with a number of factors. For example, in some cases, magnetic adjuster 400 can be driven by a voltage supply V that can provide a DC voltage or an AC voltage that is used to generate magnetic field M. When voltage supply V is the DC voltage, then magnetic adjuster 400 can provide magnetic field M in a series of magnetic pulses of a specific polarity $P_M$ corresponding to the magnetic polarity of the magnetic pulses. When magnetic element 202 has magnetic polarity P1 that is the same as magnetic field M polarity $P_M$, then the overall effect of magnetic field M is to saturate magnetic element 202. However, when magnetic element 202 has polarity P2 opposite to that of polarity $P_M$, then (depending on factors such as the coercivity of magnetic element 202, field strength of magnetic field M, and so on) the polarity of magnetic element 202 can be switched from P2 to polarity $P_M$ (same as P1 in this example). On the other hand, when voltage supply V provides the AC voltage, then magnetic field M can render magnetic element 202 magnetically neutral.

Accordingly by taking into consideration such magnetic properties of magnetic element 202 as coercivity, magnetic adjuster 400 can be used to adjust an overall magnetic property of magnetic assembly 200. Depending upon the magnetic polarity and strength of magnetizing magnetic field M, selected magnetic elements having an opposite polarity can undergo de-magnetization whereby the initial magnetic polarity and/or magnetic strength can be adjusted (in this case reduced) to a pre-determined level. On the other hand, for those magnetic elements having a like polarity, the magnetizing magnetic field M will simply force those magnetic elements to saturate (if not initially saturated). Conversely, by simply redeploying the magnetic properties of magnetizing magnetic field M, selected magnetic elements can be re-magnetized by which it is meant that those magnetic elements having had their magnetic properties "over adjusted" can nonetheless be brought into compliance using mechanism 400 in the recovery mode.

It should be noted that magnetic adjuster 400 can take many forms. In one embodiment, magnetic adjuster 400 can include a number of discrete magnetizers (402, 404) each corresponding to a specific magnetic region of magnetic assembly 200. For example, the magnetic regions can be a single discrete magnetic element such as magnetizer 402 can be associated with discrete element 202 and magnetizer 404 can be associated with discrete magnetic element 204. In this way, only those portions of magnetizer corresponding to magnetic elements selected for magnetic adjusted are activated. On the other hand, the magnetic region can encompass all or most of magnetic elements 202 in which case, all or most of magnetic elements 202 are exposed to magnetizing magnetic field M.

Conversely, magnetizing magnetic field M can also be used to recover magnetic properties of magnets or re-magnetize selected magnetic elements of magnetic array 200 depending on the magnetic polarity of strength of magnetizing magnetic field M. In this context, magnetic adjuster 400 be used to selectively de-magnetize specific magnetic regions of magnetic assembly 200 in a de-magnetize cycle during which the selected elements are exposed to a magnetizing magnetic field having a polarity opposite to that of the selected magnetic elements. In this way, those magnetic elements having opposite magnetic polarity will exhibit a reduced magnetization whereas those magnetic elements have like magnetic polarity will exhibit no change (unless, of course, they are not saturated, in which case those elements will simply tend to saturate). Magnetic adjuster 400 can be used to selectively re-magnetize selected magnetic regions of magnetic assembly 200. In what can be referred to as a recovery cycle, a magnetic region having had a magnetic strength or polarity reduced beyond that deemed acceptable can nonetheless recover.

Figure 5:
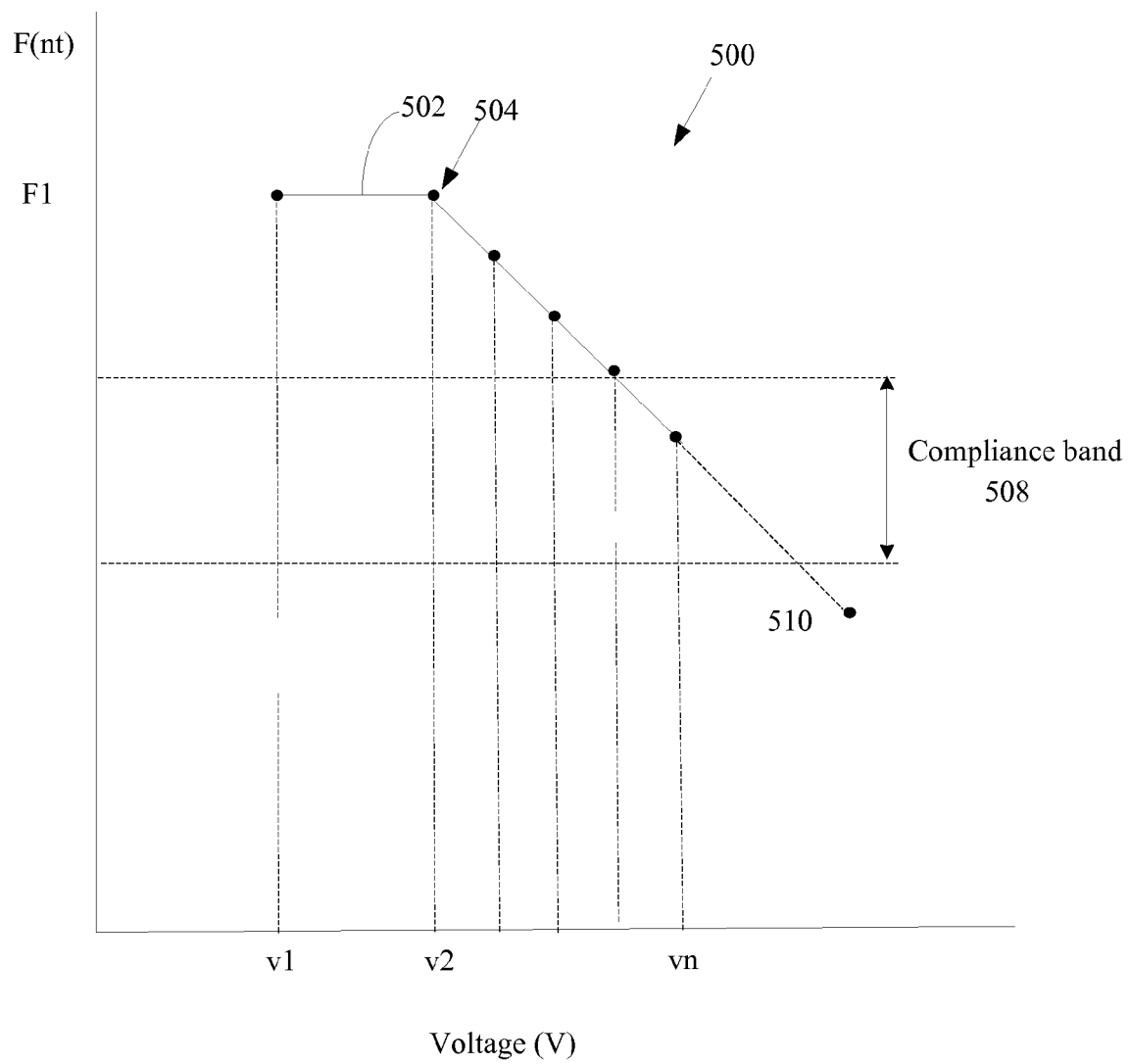
FIG. 5 shows representative graph that shows a relationship between DC voltage (Volts) and unlatch force F (nt)

FIG. 5 shows representative graph 500 that shows a relationship between DC voltage (Volt) and unlatch force F (nt). More specifically, in the embodiment shown, an adjustment process can be iterative in nature by which it is meant that first DC voltage V1 can be used by magnetic adjuster 400 to generate first adjustment magnetic field M1 resulting in unlatch force F1. It should be noted that due to variation in magnetic coercivity (ability of a magnetic material to withstand a change in magnetic properties), initial plateau 502 is observed after which knee 504 marks the beginning of a linear (or near linear) relationship between DC voltage V and observed unlatch force F. In some cases, it may be necessary to apply multiple magnetic pulses in order to bring overall latching force F into compliance (represented by acceptance band 508). In some cases, however, unlatch force F can "overshoot" compliance band 508 (noted by the dotted line 510) in which case, the magnetic adjuster 400 can be operated in a recovery mode that returns magnetic assembly to within compliance band 508.

Figure 6:
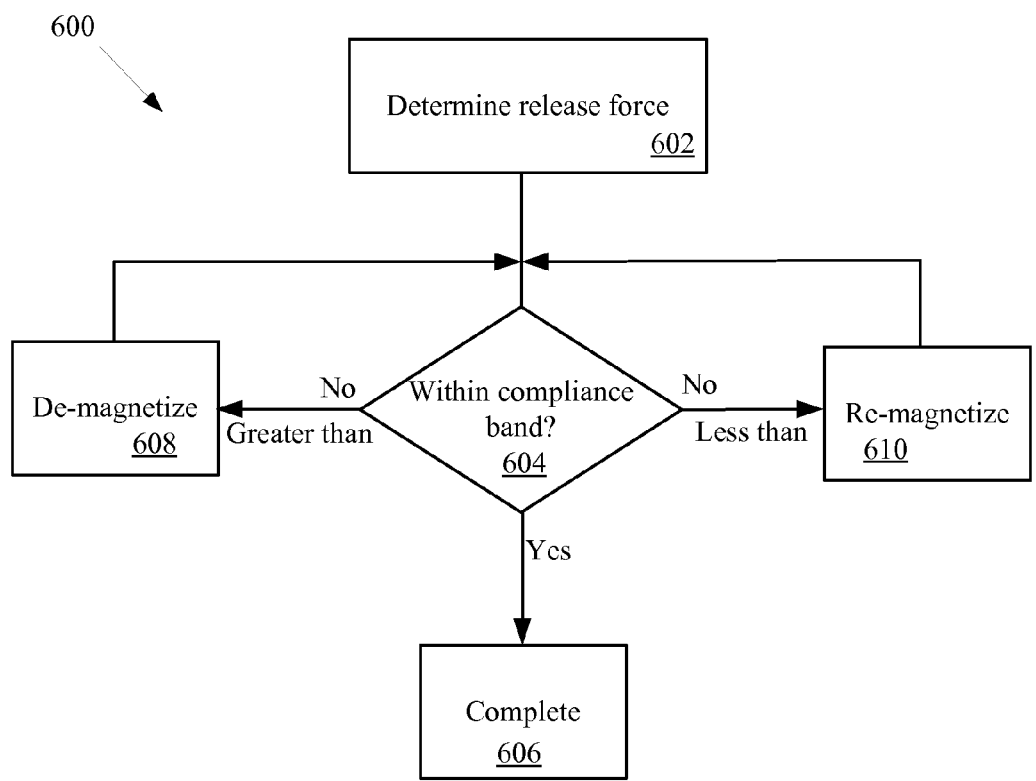
FIG. 6 shows a flowchart detailing process in accordance with the described embodiments.

FIG. 6 shows a flowchart detailing process 600 in accordance with the described embodiments. Process 600 can begin at 602 by determining an initial latching force value of the underlying magnetic latch. This latching force value can be derived from post assembly process 400 described above. In any case, at 604, a determination is made if the latching force is within a compliance band. If it is determined that the latching force is within the compliance band, then process 600 is complete, otherwise, control is passed to 608 if the latching force is greater than the compliance band where a de-magnetizing operation takes place. On the other hand, control is passed to 610 if the latching force is less than the compliance band where a re-magnetizing (or recovery) operation takes place. In any case, steps 604, 608, and 610 are repeated until the unit is determined to be acceptable or rejected.

Figure 7:
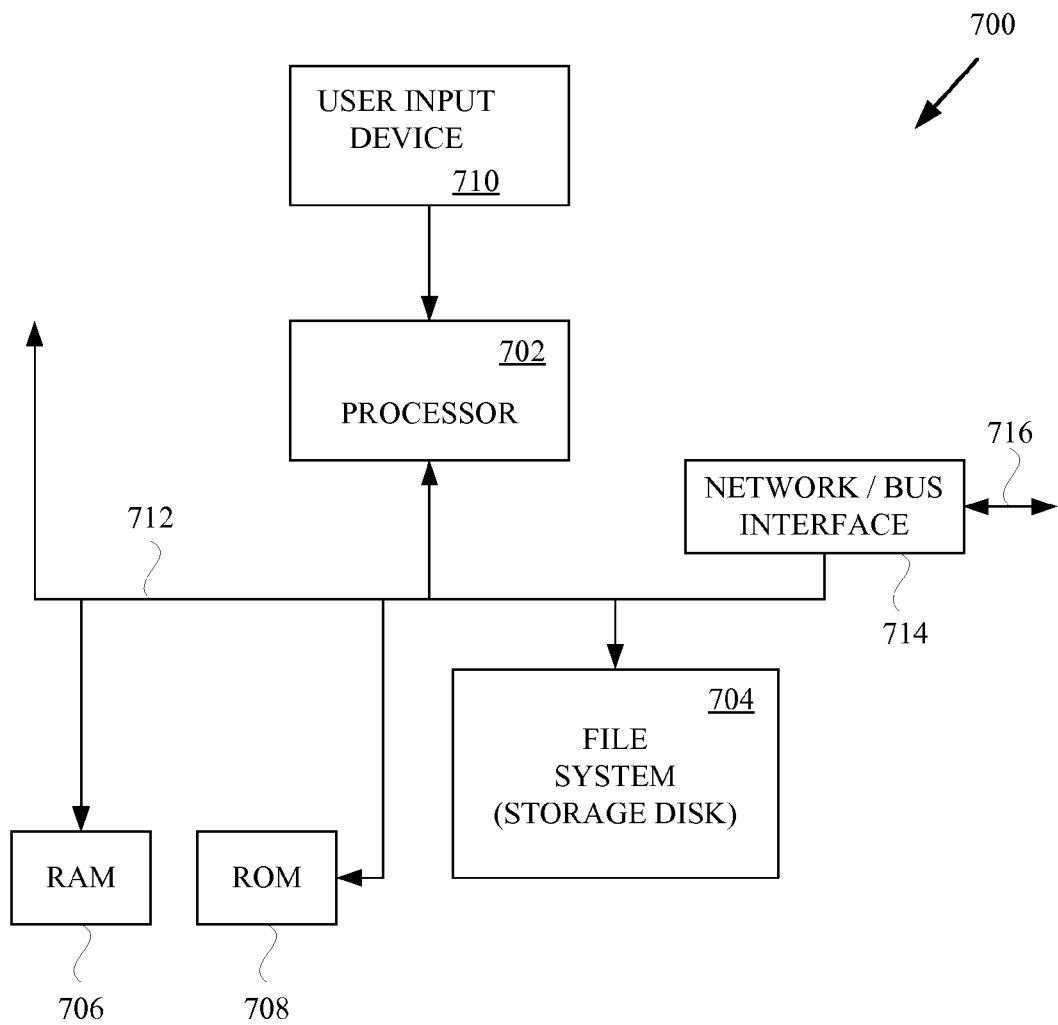
FIG. 7 is a block diagram of a computing system.

FIG. 7 is a block diagram of computing system 700. The computing system 700 includes a processor 702 that pertains to a microprocessor or controller for controlling the overall operation of the computing system 700. The computing system 700 stores data a file system 704. The file system 704 is, typically, a storage disk or a plurality of disks. The file system 704 typically provides high capacity storage capability for the computing system 700. The computing system 700 also includes a RAM 706 and a Read-Only Memory (ROM) 708. The ROM 708 can store programs, utilities or processes to be executed in a non-volatile manner. The computing system 700 also includes a user input device 710 that allows a user of the computing system 700 to interact with the computing system 700. For example, the user input device 710 can take a variety of forms, such as a button, keypad, dial, etc. A data bus 712 can facilitate data transfer between at least the file system 704, the processor 702 and other components. The computing system 700 also includes a bus interface 714 that couples to a data link 716. The data link 716 allows the computing system 700 to couple to a host device (e.g., host computer or power source). It should be noted that in some cases, the evaluation can be performed manually especially well suited for those situations of low manufacturing volume or simple process evaluation. The computing system 700 also includes a network/bus interface 714 that couples to a data link 716. The data link 716 allows the computing system 700 to couple to a host computer or to accessory devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for optimizing a release force of a magnetic latch having a magnetic element comprising:
    determining a force required to release the magnetic latch;
    determining a deviation of the release force with respect to a reference datum; and
    adjusting a magnetic property of the magnetic element in-situ in accordance with the deviation.

2. The method as recited in claim 1, wherein the adjusting the magnetic property comprises:
    de-magnetizing the magnetic element when the deviation indicates that the release force is greater than the reference datum; and
    re-magnetizing the magnetic element when the deviation indicates that the release force is less than the reference datum.

3. The method as recited in claim 2, wherein the magnetic latch is disposed within and used to secure portions of a consumer electronic product and comprising a magnetic element in a first portion of the consumer electronic product and a corresponding magnetically attractable element in a second portion of the consumer electronic product.

4. The method as recited in claim 3, wherein the consumer electronic product is a laptop, the first portion is a base unit and the second portion is a lid connected to the base by way of an attachment mechanism.

5. The method as recited in claim 4, wherein the release force corresponds to a summation of a first force required to overcome a magnetic attraction force between the magnetic element and the magnetically attractable element and a second force associated with the attachment mechanism, the release force being sufficient to move the magnetic element with respect to the magnetically attractable element a separation distance d.

6. The method as recited in claim 5, wherein the adjusting comprises:
    adjusting the first force by de-magnetizing the magnetic element when the release force is greater than a compliance band.

7. The method as recited in claim 5, wherein the adjusting comprises:
    adjusting the first force by re-magnetizing the magnetic element when the release force is less than the compliance band.

8. The method as recited in claim 7, wherein the magnetic element comprises a plurality of discrete magnetic elements.

9. The method as recited in claim 8, wherein the adjusting comprises:
    adjusting the first force by de-magnetizing selected ones of the plurality of discrete magnetic element when the release force is greater than the compliance band.

10. The method as recited in claim 8, wherein the adjusting comprises:
    adjusting the first force by re-magnetizing selected ones of the plurality of discrete magnetic element when the release force is less than the compliance band.

11. A post assembly quality check station for checking a compliance of a release force associated with a magnetic latch used to secure a lid and base unit of a laptop, comprising:
    a release force analyzer configured to determine the release force; and
    a magnetic adjuster in communication with the release force analyzer, the magnetic adjuster configured to adjust magnetic properties of the magnetic latch in-situ in accordance with a deviation of the release force with respect to a reference datum.

12. The post assembly quality check station as recited in claim 11, the release force analyzer comprising:
    a securing element used to secure the base unit;
    an arm used to apply a force to the lid in order to move the lid with respect to the base unit;
    a force detector used to detect the applied force during a test;
    a movement detector used to detect a separation distance between the base unit and the lid, wherein the movement detector records to a database a release force as the force applied by the arm when the separation distance is a pre-determined value; and
    a comparator unit configured to provide the release force deviation by comparing the recorded release force and the reference datum.

13. The post assembly quality check station as recited in claim 11, the magnetic adjuster comprising:
    a coil coupled to a driven by a DC voltage source.

14. The post assembly quality check station as recited in claim 11, the magnetic adjuster comprising:
    a coil coupled to and driven by an AC voltage source.

15. The post assembly quality check station as recited in claim 11, the magnetic element comprising discrete magnetic elements.

16. The post assembly quality check station as recited in claim 15, the magnetic adjuster comprising a plurality of discrete coils each coupled to a corresponding voltage source and configured to adjust the magnetic property of a corresponding discrete magnetic element.

17. The post assembly quality check station as recited in claim 16, wherein the voltage source is either a DC voltage source or an AC voltage source.

18. An apparatus for optimizing kinematics of a magnetic latch having a magnetic element comprising:
    means for determining a release force required to release the magnetic latch; and
    means for determining a deviation of the release force with respect to a reference datum; and
    means for adjusting a magnetic property of the magnetic element in-situ in accordance with the deviation.

19. The apparatus as recited in claim 18, wherein the means adjusting the magnetic property comprises:
    means for de-magnetizing the magnetic element when the deviation indicates that the release force is greater than the reference datum; and
    means for re-magnetizing the magnetic element when the deviation indicates that the release force is less than the reference datum.

20. The apparatus as recited in claim 19, wherein the magnetic latch is disposed within and used to secure portions of a consumer electronic product and comprising a magnetic element in a first portion of the consumer electronic product and a corresponding magnetically attractable element in a second portion of the consumer electronic product attached to the first portion.

* * * * *